(12) United States Patent
Gunatilake

(10) Patent No.: US 6,847,780 B2
(45) Date of Patent: Jan. 25, 2005

(54) TRICK-MODE STREAM CREATION FOR PERSONAL VIDEO RECORDING FUNCTIONS

(75) Inventor: Priyan Deveka Gunatilake, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 242 days.

(21) Appl. No.: 10/113,018

(22) Filed: Mar. 28, 2002

(65) Prior Publication Data

US 2003/0185543 A1 Oct. 2, 2003

(51) Int. Cl.⁷ .................................................. H04N 5/91
(52) U.S. Cl. ........................... 386/68; 386/46; 386/125
(58) Field of Search ....................... 386/6–8, 33, 45–46, 386/65, 68–70, 81, 124–126; 375/240.28

(56) References Cited

U.S. PATENT DOCUMENTS

| | | | |
|---|---|---|---|
| 5,796,393 A | | 8/1998 | MacNaughton et al. |
| 5,799,318 A | | 8/1998 | Cardinal et al. |
| 5,923,811 A | * | 7/1999 | Kawamura et al. ........... 386/65 |
| 6,047,027 A | * | 4/2000 | Miyagosi et al. ...... 375/240.28 |
| 6,141,486 A | * | 10/2000 | Lane et al. .................... 386/68 |
| 6,504,920 B1 | | 1/2003 | Okon et al. |
| 6,519,629 B2 | | 2/2003 | Harvey et al. |
| 2002/0001458 A1 | | 1/2002 | Abelard et al. |

FOREIGN PATENT DOCUMENTS

GB        2367916 A        4/2002

OTHER PUBLICATIONS

International Search Report PCT/US03/09335, Nov. 12, 2003, 1pg.

* cited by examiner

*Primary Examiner*—Thai Tran
*Assistant Examiner*—Christopher Onuaku
(74) *Attorney, Agent, or Firm*—Blakely, Sokoloff, Taylor & Zafman LLP

(57) ABSTRACT

A method and system respond to a user request for trick-mode play. A decoding device conveys the request to a device for storing a video stream. A current point location in the memory is frozen and the pointer is set back by a preselected back track distance. Then a search for a first target header is begun. The target header is either a sequence or GOP (group of pictures) header. When a target header is found, a data segment is selected which includes the target header. This is the start of the trick-mode stream. Further target headers are sought and further data accessed until a full trick-mode stream has been generated.

15 Claims, 3 Drawing Sheets

TRICK-MODE STREAM CREATION FOR PERSONAL VIDEO RECORDING FUNCTIONS

FIELD OF INVENTION

The present invention relates to devices for recording video stream data and more particularly to creating trick-mode streams.

BACKGROUND OF THE INVENTION

Personal video recording is a new digital technology in which a video stream is recorded on a medium such as a hard drive. In its most common form, an MPEG2 video steam is decoded. The decoder may be included in a digital television, a cable/satellite set top box or personal video recorder. "Trick-mode" refers to such functions as pause, rewind and slow-motion. The trick is that these modes may be applied to a live broadcast. The illusion of pausing a live broadcast is given by continuing to record a broadcast after a pause button is activated and playing the recording back on command. Trick-mode operation is achieved by playback of a video stream called the "trick-mode stream" on the decoding device. A trick-mode stream can be created in different ways. The speed of response and picture quality in utilization of the trick-mode stream will be functions of the manner in which the stream is created. Two different ways of creating the trick mode stream are the most prevalent.

One form of video stream creation is based on a look-up table. During recording of the stream, a table is created which contains pointers to various information in headers each associated with a video signal payload. A table is assembled which can point to headers for a Group of Pictures (GOP), sequence or picture. This table is used to assemble the trick-mode stream during trick-mode playback. Headers are selected in correspondence with the particular trick-mode that is commanded. Implementing this form of recording requires software that provides extensive CPU intervention during the recording process in order to parse the video stream and select header information to generate the pointer table. More recently, in the alternative, specialized hardware modules have been developed to implement the algorithms for generating the look-up tables.

Another prevalent way of creating the trick-mode stream is concatenating segments of a full-recorded stream. Selection of segments is based on heuristic criteria. For example, at initiation of playback, hardware could select segments of the recorded stream at each new sector of the storage device. This method is fast and simple. However, the frames accessed while producing the trick-mode stream may be partial in some cases rather than complete. Including partial frames in the trick-mode stream causes presentation of undesirable video artifacts in the playback display.

SUMMARY OF THE INVENTION

The present invention provides trick-mode playback which is efficient in terms of the degree of processing required to access desired streams for playback and reliable in terms of accessing and decoding I-frames (frames with information defining fold video data rather than frame-to-changes). Briefly stated, in accordance with the present invention, there are provided a method and system in which in response to a user request for trick-mode play, a decoding device conveys the request to a device for storing a video stream. A current point location in the memory is frozen and the pointer is set back by a preselected back track distance. Then a search for a first target header is begun. The target header is either a sequence or GOP (group of pictures) header. When a target header is found, a data segment is selected which includes the target header. This is the start of the trick-mode stream. Further target headers are sought and further data accessed until a full trick-mode stream has been generated.

BRIEF DESCRIPTION OF THE DRAWINGS

The invention may be further understood by the following description taken in connection with the following drawings.

Of the drawings.

DETAILED DESCRIPTION

Figure 1:
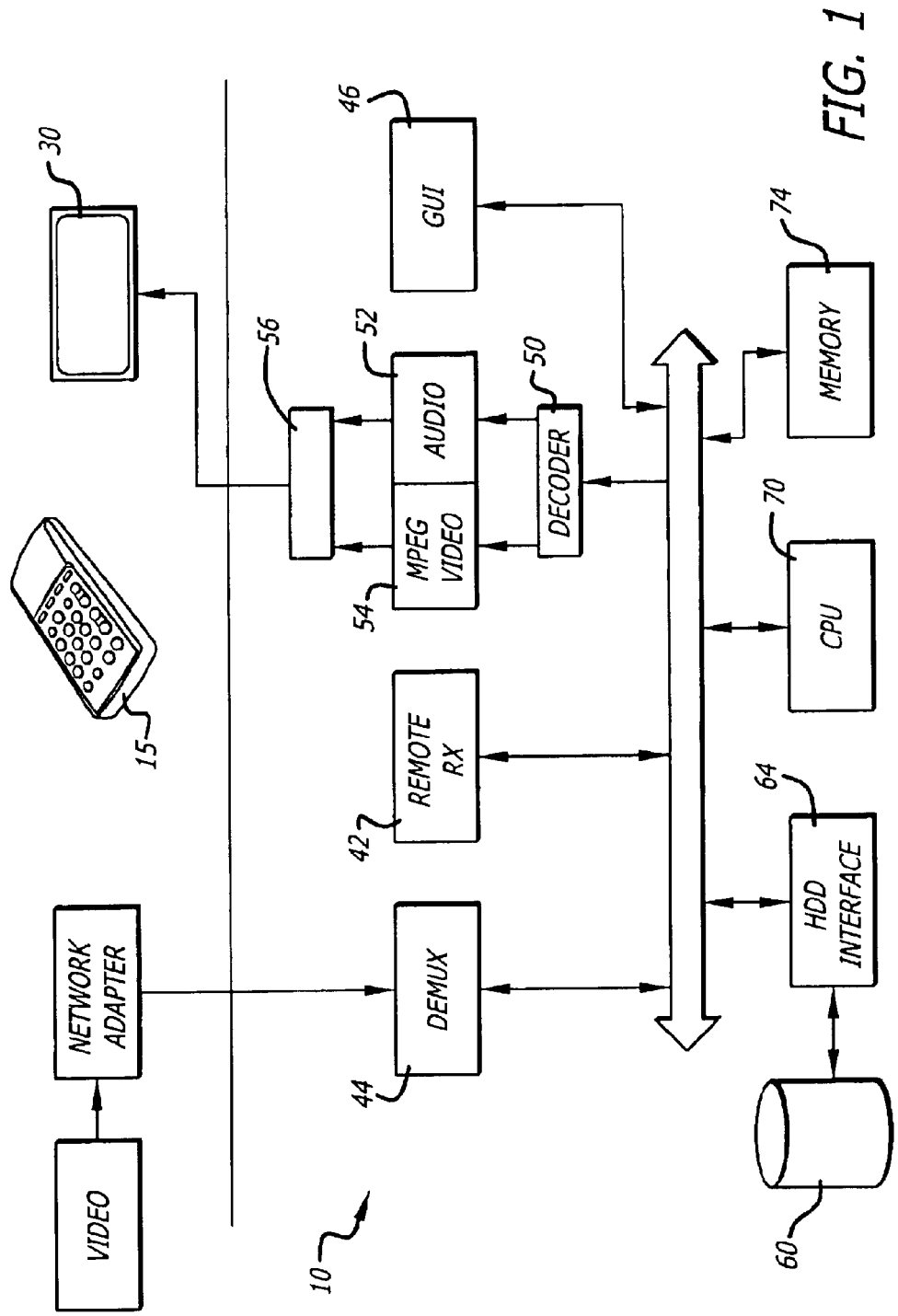
FIG. 1 is a block diagram of a video stream decoder and recorder system, such as a personal video recorder.

FIG. 1 is a block diagram of a personal video recorder (PVR) 10 which receives video input from a video stream source 20. The video stream source 20 could, for example, comprise a cable head-end, internet service provider or local video server. While video streaming is a significant application, as discussed further below, the invention is applicable to other forms of audio-video encoded signals. Video streaming is cited by way of example. A network adapter 25 couples the video source 20 to the PVR 10. Preferably, the PVR 10 further comprises a remote control unit 15. The PVR 10 provides an output to a monitor 30, which may comprise an analog or digital television set. Within the PVR 10, internal communication is done over a communication bus 40.

A transmission stream (TS) demultiplexer unit 44 receives the video stream from the network adapter 25 and provides an output to the digital bus 40. The demultiplexer unit 44 may also include fixed and programmable filters. Video signals are provided to a decoder 50 including an audio decoder 52 and a video decoder 54. The decoders 52 and 54 provide outputs to an interface circuit 56 providing an output for coupling to the monitor 30. The video stream is also provided to the storage means 60 for recording. In the currently preferred form, the storage means 60 comprises a hard disk drive. The hard disk drive 60 is coupled to the communications bus 40 via a hard disk drive interface 64. Operations are controlled by a microprocessor 70, and programs are stored in a memory 74. A buffer 80 is used in the creation of a trick-mode video stream.

Figure 2:
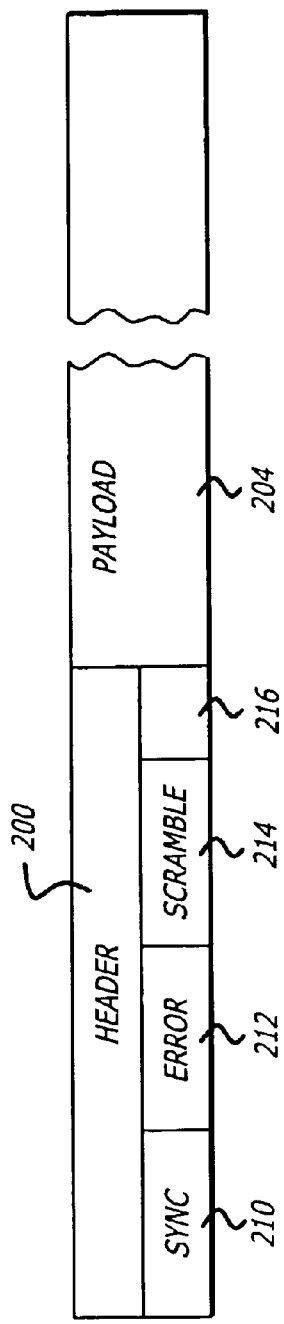
FIG. 2 is a diagram of a transmission stream packet including both a header and a payload.
Figure 3:
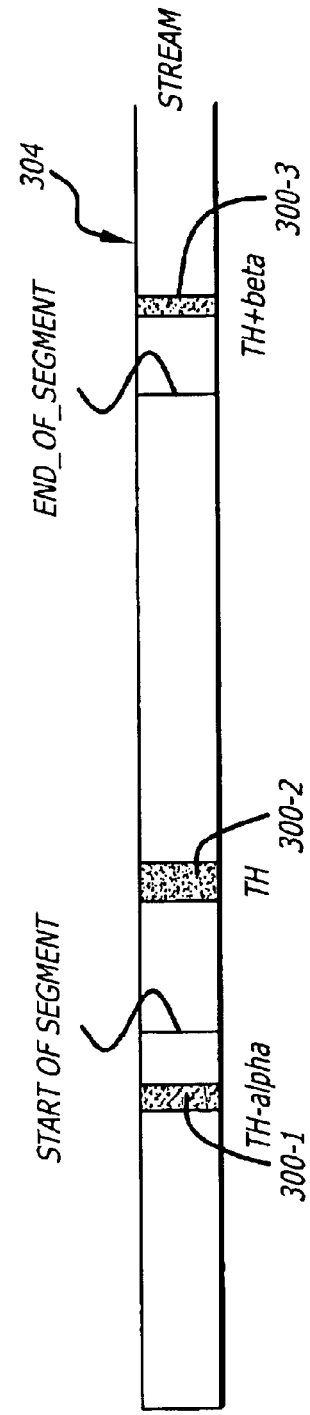
FIG. 3 is an illustration of a video stream including a number of successive target headers and illustrating a data segment.

FIG. 2 is an illustration of transport stream structure. The transport stream is formed by multiplexing packetized elementary stream (PES) packets. During the formation of the transport stream, additional packets containing tables needed to de-multiplex the transport stream are inserted. The tables are referred to as PSI. It should be noted that the transport stream is a structure intended to be transported over lossy networks, such as every day transmission networks. An alternative form of stream, namely PS, is used in non-lossy contexts such as digital video disk (DVD) players. TS packets 200 comprise a header 202 and a payload 204. Packets are of a fixed length of 188 bytes. The header is at least four bytes. The header 202 includes a sync byte 210, nominally 5 bits long. A number of other well-known bits are included. For example, a transport error indicator bit 212 and a transport scrambling control bit 214 are provided. Other packets 216 perform other known functions. Null packets may be inserted to fill intervals between packets that bear information. Null packets contain dummy payloads. In accordance with the present invention, headers will be sought by processing methods for generating the trick-mode stream. These headers will be referred to as target headers 300 in a video stream 304. In the illustration of FIG. 3, three different target headers 300-1, 300-2 and 300-3, are illustrated.

Figure 4:
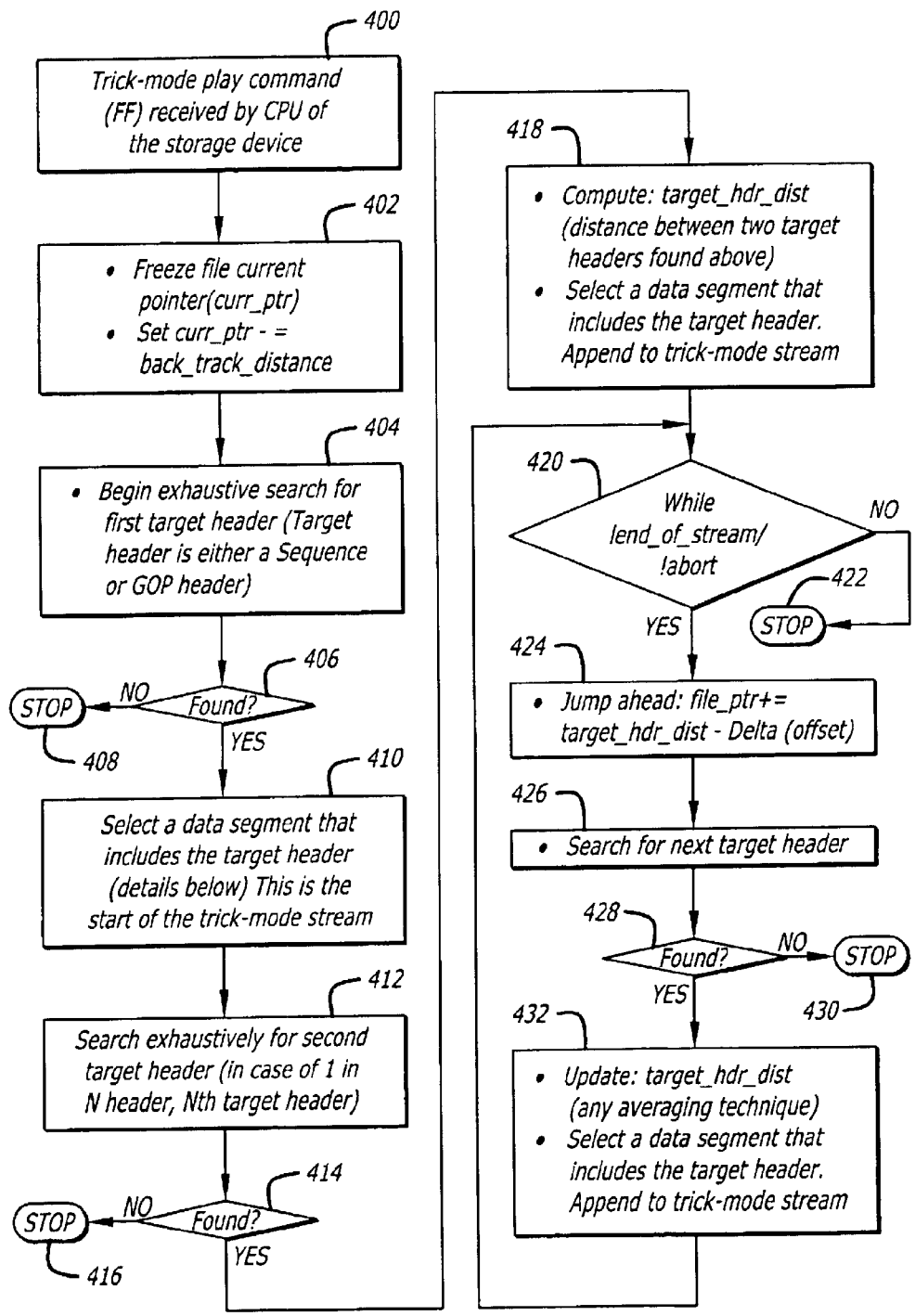
FIG. 4 is a flowchart illustrating software structure and operation of the present invention.

FIG. 4 is a flow diagram in connection with which operation of the present invention is explained. Hardware references are two components illustrated in FIG. 1, and references to communication structures are with reference to FIGS. 2 and 3.

A trick-mode is generally initiated by a user operating the remote control 15. The remote control receiver 42 issues commands to the microprocessor 70, and the microprocessor 70 provides user information to the graphical user interface 46. Operation is initiated at block 400 of FIG. 4 in which trick-mode command play is received by the CPU 70. At block 402, a current file pointer pointing to a location on the hard disk 60 is frozen and the pointer location is incremented. The current pointer is set to a location displaced by a back_track_distance. Different functions will call for different incrementing. For example, a pause command will hold the current pointer location until the PVR 10 is again commanded to play. For fast forward, or rewind, target headers will be beyond or prior to current locations respectively.

At block 404, an exhaustive search for the first target header is initiated. At block 406, if the target header is not found, then operation stops at block 408. However, when the target header is found, operation proceeds to block 410. The data segment including the target header is the start of the trick-mode stream or trick-mode signal. Trick-mode signal is used in the present description to comprise an audio-video encoded signal that is not produced by streaming. Streaming is a subset of available types of encoding. The data segment is provided from the memory 60 to the buffer 80. The next target header is found in accordance with operation at block 412. The next target header is a function of the operation commanded. For example, where fast forward is commanded, only a fraction of the video frames are desired to be displayed. This is described as finding one in N headers. The Nth target header is searched for. In the case of pause, the second target header will equal the first target header. At decision block 414, if a second target header is not found, operation is stopped at block 416. However, it is contemplated that the second target header will be found and operation proceeds to block 418.

At block 418, the target header distance, i.e. the distance between the two target headers found in accordance with the search is calculated. A next data segment is selected that includes the second target header. That data segment is appended to the trick-mode stream by delivering the segment to the buffer 80 from the memory 60. Operation proceeds similarly. At decision block 420, it is determined if the end of the stream has been reached. If so, operation is stopped at block 422. Otherwise, operation proceeds to block 424. The pointer jumps ahead. This may be described as file_PTR+=target_HDR_DIST-Delta (offset). At block 426, the next target header is searched for. If it is not found, after decision block 428, operation stops at block 430.

However, usually the target header will be found, and at block 432, the target header distance is updated, a next data segment that includes the target header is selected and appended to the trick-mode stream. Operation returns to block 420. Successive next target headers are selected until operation in the trick-mode is commanded to be stopped.

The process of selecting a data segment that includes the target header is described with respect to FIG. 3. As described with respect to FIG. 2, each header includes a sync signal. Searching for the data segment comprises searching for two consecutive sync signals. For example, a first search is done for the form of the sync signals and then a next sync signal should follow 187 bytes later. The second target header 300-2 is selected for purposes of this explanation to correspond to the detected target header. Once the detected target header is selected, a stream segment from TH−α to TH+β is chosen. Typically, the α value is very much less than β. A typical value for α is 512 bytes. A typical value for β is dependent on the stream content as well as the target header. The target header may either comprise a sequence or GOP, i.e. a group of pictures. The value β is chosen such that an I-frame which follows the target header is included in the data segment. An I-frame is a frame which includes full data for the frame as opposed to merely including increments of an occurring frame with respect to a preceding frame. In one nominal application, β was set to 512 KB. A high value for β will produce complete I-frames most of the time.

A further test may be performed to ensure that complete I-frame is included within the selected data segment. In addition to searching for a sync byte, the presence of a B or P picture start header may also be checked.

The current technique is applicable to other forms of audio-video encoding besides MPEG2. These other forms include, for example, digital video (DV), JPEG 2000, MPEG4, an amorphous streaming format, or other audio-video encoding formats of which streaming is a subset. Where the MPEG2 TS stream is encapsulated with another form, such as IEEE 1394, ATM (Asynchronous Transmission Mode) or IP, the structure will include additional header bytes beyond those illustrated in FIG. 2. In the current MPEG2 example, a separation of 187 bytes is assumed between sync bits. In processing other forms, additional header bytes need to be accounted for in the separation between successive sync test bytes. It does not make a difference in operation if the transfer stream is scrambled or not.

Many variations will occur to those skilled in the art to provide a trick-mode efficient operation in accordance with the present invention while departing from specific examples illustrated herein.

What is claimed is:

1. A method for generating a trick-mode signal based on an audio-video encoded signal comprising packets, each packet comprising a header and a payload, comprising, in response to a trick-mode command, defining a search range in a memory having an audio-video encoded signal recorded therein;

selecting a target header in said ranges;

selecting a data segment including the target header, the data segment extending a first predetermined number of bytes prior to the target header and a second predetermined number of bytes after the target header, the first predetermined number of bytes being substantially less than the second predetermined number of bytes;

providing the data segment to a trick-mode signal; and defining a next search range and continuing to locate next target headers and provide next data segments to the trick-mode signal.

2. A method according to claim 1 wherein defining a search range comprises freezing a file current pointer and changing the location of the current pointer by a back track distance.

3. A method according to claim 2 wherein searching for a next header comprises defining a non-consecutive relationship with said first header.

4. A method according to claim 3 wherein said non-consecutive relationship comprises selection of one in N headers.

5. A method according to claim 2 wherein selecting a data segment including the target header comprises incrementing the file pointer by a target header distance minus and offset, where the offset comprises a distance to permit the search to locate an I-frame.

6. A machine-readable medium for producing a trick-mode signal that provides instructions which when executed by a processor, cause said processor to perform operations comprising:

in response to a trick-mode command, defining a search range in a memory having an audio-video encoded signal recorded therein;

selecting a target header in said range, selecting a data segment including the target header, the data segment extending a first predetermined number of bytes prior to the target header and a second predetermined number of bytes after the target header, the first predetermined number of bytes being substantially less than the second predetermined number of bytes;

providing the data segment to a trick-mode signal; and defining a next search range and continuing to locate next target headers and provide next data segments to the trick-mode signal.

7. A machine-readable medium in accordance with claim 6 for defining a search range comprises freezing a current file pointer and changing the location of the current file pointer by a back track distance.

8. A machine-readable medium in accordance with claim 7 wherein searching for a next header comprises defining a non-consecutive relationship with said first header.

9. A machine-readable medium in accordance with claim 8 wherein said non-consecutive relationship comprises selection of one in N headers.

10. A machine-readable medium in accordance with claim 7 wherein selecting a data segment including the target header comprises incrementing the file pointer by a target header distance minus and offset, where the offset comprises a distance to permit the search to locate an I-frame.

11. A processor for producing a trick-mode video signal comprising:

a memory search circuit for accessing a memory storing a recorded video signal;

said memory search circuit activated in response to a trick-mode command and defining a search segment in said memory;

a test circuit for accessing a signal in said signal indicative of location of a header;

means for selecting a data segment, the data segment including the target header and extending a first predetermined number of bytes prior to the target header and a second predetermined number of bytes after the target header, the first predetermined number of bytes being substantially less than the second predetermined number of bytes;

means for providing said data segment to a trick-mode video signal; and means searching for next headers and data segments.

12. The processor according to claim 11 wherein said signal indicative of presence of a target header is a sync signal.

13. The processor according to claim 12 wherein said search defining means comprises a pointer and pointer counter and wherein said pointer counter sets said pointer to a preselected distance from a current pointer position when said trick-mode command is received.

14. The processor according to claim 13 wherein said counter increments by a pre-determined amount in accordance with the trick-mode command to initiate a starting point for searching for a next target header.

15. The processor according to claim 14 wherein said counter in incremented by a target header distance minus an offset, where the offset permits said search to encounter a data segment including a target header and an I-frame.

* * * * *